United States Patent [19]

Phillips et al.

[11] Patent Number: 4,673,938
[45] Date of Patent: Jun. 16, 1987

[54] SITUATION AWARENESS MODE

[75] Inventors: Robert A. Phillips, Crownsville; Calvin A. Cassidy, Glen Burnie, both of Md.

[73] Assignee: The United States of America as represented by the Secretary of the Air Force, Washington, D.C.

[21] Appl. No.: 772,813

[22] Filed: Sep. 5, 1985

[51] Int. Cl.⁴ .............................................. G01S 13/74
[52] U.S. Cl. ...................................................... 342/95
[58] Field of Search .................. 343/7 A, 7.3, 7.4, 7.5

[56] References Cited

U.S. PATENT DOCUMENTS

| | | | |
|---|---|---|---|
| 3,064,250 | 11/1962 | Close | 343/7.3 |
| 3,267,323 | 8/1966 | Gerwin | 315/18 |
| 3,308,456 | 3/1967 | Leuenon et al. | 343/7 A |
| 3,699,573 | 10/1972 | Andrews | 343/7.3 |
| 3,731,304 | 5/1973 | Coopers et al. | 343/7 A |
| 3,831,174 | 8/1974 | King et al. | 343/7 A |
| 3,845,481 | 10/1974 | Danzer et al. | 343/7.3 |
| 3,891,988 | 6/1975 | Ryan et al. | 343/7.3 |
| 3,987,440 | 10/1976 | Danzer | 343/7 A |
| 4,075,703 | 2/1978 | Dillard | 364/715 |
| 4,509,049 | 4/1985 | Haentel et al. | 343/7.5 |

Primary Examiner—Thomas H. Tarcza
Assistant Examiner—Donald E. Hayes, Jr.
Attorney, Agent, or Firm—William G. Auton; Donald J. Singer

[57] ABSTRACT

A modification is presented to improve radar systems, which normally tracks a single target, to enable them to perform a simultaneous search of a large space volume while maintaining track of a selected target. This modification entails an operating process in which a search is conducted with a controlled search pattern and search time so that the antenna is as close as possible to the tracked target position at the search conclusion and antenna slewing time is mimimized. Finally, the present procedure can be implemented while adding as little as a thousand words of memory to the radar system.

7 Claims, 7 Drawing Figures

SITUATION AWARENESS MODE

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to airborne radar tracking systems, and specifically to a modification of such systems to provide a simultaneous search/target track capability.

The AN/APG-66 radar was deployed during the late 1970's on F-16 fighter aircraft. At that time single target track was considered to be the primary weapon release mode. The typical engagement was one F-16 against one enemy aircraft, and the missiles used were relatively short range. Once the high priority target was selected for attack, full concentration of radar power was applied to complete the engagement.

Tactics have changed since that time. One-on-one attack is no longer a viable possibility and concentrating full radar energy on a single target blinds the F-16 to other targets and exposes it to counter attack by the remainder of the enemy formation. Newer long range missiles are being developed which make it possible to attack at longer ranges but current radar technology will not support them.

The task of providing fighter aircraft with the ability to simultaneously track a target and sense other approaching aircraft is alleviated, to some extent, by the following U.S. Patents, which are incorporated herein by reference:

U.S. Pat. No. 3,064,250 issued to Close on Nov. 13, 1962;

U.S. Pat. No. 3,267,323 issued to Gerwin on Aug. 16, 1966;

U.S. Pat. No. 3,699,573 issued to Andrews et al on Oct. 17, 1972; and

U.S. Pat. No. 3,987,440 issued to Danzer on Oct. 19, 1976.

The Andrews, Danzer and Close references all disclose track-while-scan (TWS) radar systems. Andrews et al are concerned with a track-while-scan radar that initiates tracking of a target on the basis of previous position information or plots stored in a computer memory. This reference discloses a system in which the actual updating of the target's position is automatically performed by the computer, and the decision to track a given target is manually performed by an operator observing a target position display console. In Danzer "sliding window" computer processing is used with a system that tracks the target while scanning of an entire sector area continues. The Close track-while-scan channel automatically alters its operating parameters to fit the tracking conditions which exist at the moment. Gerwin is directed to a single servo multiple target automatic tracking circuit. The Gerwin device operates on time sharing principles.

These TWS systems are alternatives which may be substituted in place of the existing radar used by the F-16 TWS systems are capable of providing track quality information on up to 10 targets within the radar field of view. Counter attacks on the F-16 by the enemy formation are minimized and the deployment of AM-RAAM missiles allows for multiple launches at long ranges.

TWS systems have been proposed and are under development for use by the U.S. Air Force as substitute systems to the single target track radar systems currently used. However, an alternative to replacing existing APG-66 radars and other inexpensive systems, which are currently in the U.S. arsenal, is modifying existing systems to provide them with a simultaneous search/track capability.

In view of the foregoing discussion, it is apparent that there currently exists the need for a modification of existing radar systems so that they are capable of detecting the presence of other aircraft while tracking a selected target The present invention is intended to satisfy that need.

SUMMARY OF THE INVENTION

This invention is directed to the modification of small inexpensive radar systems such as the AN /APG-66 (F-16 radar) in such a way as to provide a simultaneous search/target track capability. In its basic configuration the system allows simultaneous radar search of a large space volume and track of a single operator selected target.

Single target track (STT) radar systems normally follow a sequence of search, verification and track on a single target Once a selected target is being tracked, the STT antenna remains slewed to that target, and the STT system blinds its host aircraft to other targets.

The present invention includes a modification that improves STT radar systems so that they may search for additional aircraft while maintaining track on a selected target When using the process of the present invention, the radar system is directed to perform a continuous radar sequence consisting of three phases. In the first or search phase the radar antenna is scanning and the coverage is controlled to provide a fixed update rate to the tracker while at the same time minimizing antenna slew time. The second or reacquisition phase involves placement of the radar antenna over the tracked target and redetecting it. Finally, the third phase involves estimating the target position and velocity from range and angle measurements made during the redetect stage. The system is fully dynamic allowing the accuracy to be controlled while minimizing RF emissions directed at the target aircraft.

It is a principal object of the present invention to provide a modification that enables single target track radar systems to detect the presence of other aircraft while maintaining track on a primary target.

It is another object of the present invention to provide an alternative to the replacement of existing radar systems in the U.S. arsenal.

It is another object of the present invention to provide a system that enhances the abilities of single target track radar systems while requiring only an additional 1,000 words of estimated additional 20,000 words of memory, plus a programmable signal processor.

It is another object of the present invention to allow the control of accuracy from simple equations by dynamically adjusting the scan time or the lock time.

It is another object of the present invention to reduce the chances of detection by the enemy, by reducing radar emissions at the target.

It is another object of the present invention to reduce the lock time of single target track radar systems.

It is another object of the present invention to minimize antenna slew time for mechanically scanned antennas.

These together with other objects features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a modification that improves existing single target tracking (STT) radar systems, to provide them with a simultaneous search/target track capability. One such system is the AN/APG-66 radar system, which is currently used in the F-16 fighter aircraft The STT design of the AN/APG-66 radar system causes that system to initially search for a target, verify a target echo return signal, then to solely track that single target.

The single target track approach provides target tracking accuracy, but blinds the radar system to other aircraft. An alternative to the substitution of new radar systems possessing track-while-scan capabilities for existing systems is the modification of existing systems with the present invention.

In operation, the prior art single target tracking radar system begins with a search for targets. Until a target is actually acquired, the radar devotes its time exclusively to search. Once a target is initially acquired, the prior art radar system does a verification step. During verification, the radar attempts, on the basis of acquired target state data (position and velocity) to predict the next sensed position of the radar target. If the next received target echo return is within an acceptable range from the predicted position, the radar system verifies that a target has been acquired and tracking begins.

Figure 1:
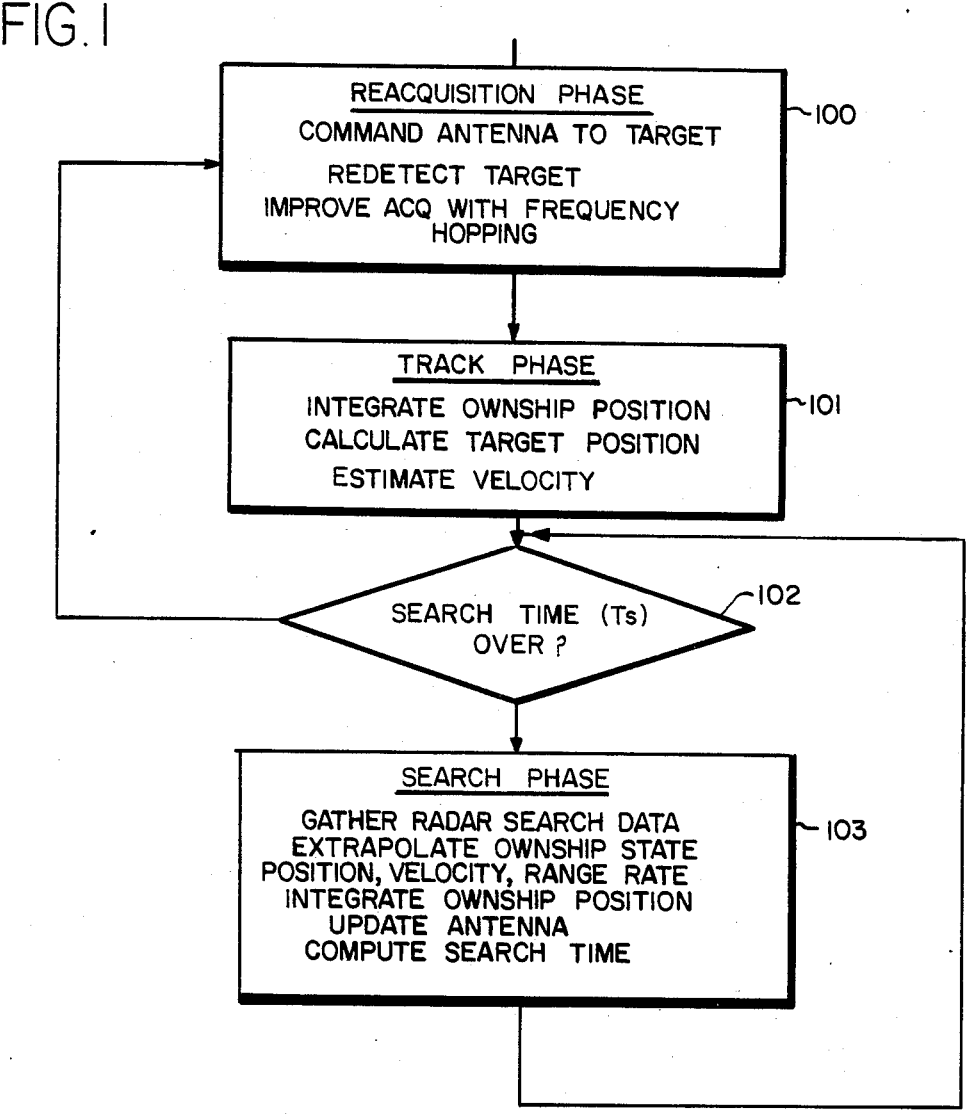
FIG. 1 is an illustration of the software blocks of the three phases of the present invention.

The present invention allows the prior art process to run its course, then allows the selection of a situation awareness mode (SAM) which provides the simultaneous search/target track capability to the existing radar system. When using the SAM process, the radar system is directed to perform a continuous radar sequence consisting of three phases: search, reacquisition, and track. FIG. 1 is an illustration of these phases in the form of software blocks as they are provided to an existing radar system's control computer.

The search phase 103 of SAM allows the radar system to perform a search over a controlled search pattern for a calculated period called a search time ($T_s$). In practice, this search phase is in duration from 1 to 6 seconds and is calculated by an equation discussed below.

The SAM system enables a single target track radar to accomplish a search while maintaining target track accuracies by minimizing the antenna slew time. The search phase of SAM 103 is performed with a control of the search pattern in the search phase 103, so that when the search time expires, the antenna will be close to the tracked target position.

The reacquisition phase of SAM 100 involves placement of the radar antenna over the tracked target and redetecting. This phase is critical to SAM since if the tracked target cannot be redetected the radar will break track. There are several enhancements to radar detection capability which have been developed specifically for SAM to improve the probability of detection.

The third phase of SAM is tracking phase 101 which involves estimating the target position and velocity from range and angle measurements made during the reacquisition phase 100. The time it takes for updating the target state is critical since during this time the transmitter is radiating in the direction of the target and the enemy radar warning gear can be tripped. In the track update area, the velocity of the target is estimated from position measurements widely separated in time rather than from outputs of a single target track Kalman filter. This concept reduces the lock time by almost a factor of 10 while yielding very little with respect to performance.

The search phase of SAM typically lasts from 1 to 6 seconds and is carefully controlled to maximize the probability that the antenna can successfully be placed back over the tracked target when a track update is due. The success of this phase is a result of the ability of the tracker to extrapolate the target position from estimates of velocity. An error cube is computed from estimates of SAM velocity noise and a specified maximum target acceleration as shown in FIG. 2.

Figure 2:
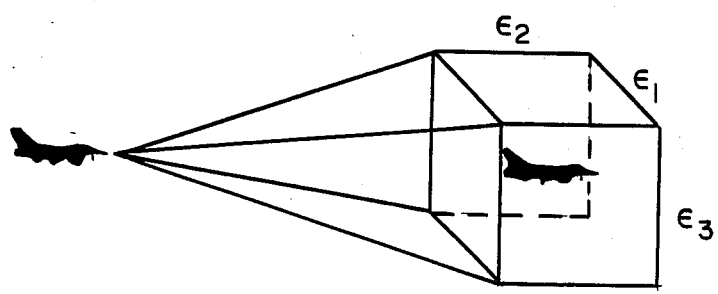
FIG. 2 is an illustration of the error cube about a tracked target's position.

FIG. 2 is an illustration of the use of the error cube to adjust the search time and prevent the escape of a target. As illustrated, a three dimensional error bound is computed on the target's position. These error bounds form a cube, which has dimensions $\epsilon_1$, $\epsilon_2$ and $\epsilon_3$ which are computed as a function of velocity errors and maximum target acceleration When this error cube exceeds a certain dimension related to the antenna beamwidth the search time is over. For this mechanization of SAM the search time is computed from:

$$(\tfrac{1}{2} \times A \times T_S^2 2 \times SIG \times T_S)/R = 0.026 \qquad \text{EQ. (1)}$$

Where:
A = Expected target acceleration (ft/sec²)
SIG = standard deviation of target speed error (ft/sec)
R = target range (ft)
0.026 = allowable angle error (radians) = 1.5 degrees
$T_S$ = allowable scan time (sec) and × is a multiplication sign.

The left side of Equation 1 predicts the angle error caused by uncertainties in velocity (SIG) and acceleration (A). The right side of Equation 1 specifies the allowable angle error caused by extrapolation of the estimated target state during the search phase.

The maximum time delay in the estimates of position and velocity allowable by the fire control solution is another limitation on the scan time $T_S$. These allowable delays are usually specified as a function of range. At long range, delays of 2 to 4 seconds are acceptable while at short range 0.5 to 1 second must be achieved. In the SAM tracker, the delay in estimating target velocity is approximately ½ of the allowed scan time. Thus, the following boundary condition must also be applied in computing the scan time. EQ. $2 < T_S$ Allowable Fire Control Delay For the F-16 fire control Equation 1 always yields a smaller time than Equation 2 so that for this particular mechanism Equation 2 does not need to be solved.

A third limitation on the scan time $T_S$ must also be applied. This limitation is indirectly caused by the tracker solution and is related to accuracy. Since target observations are made at intervals of the scan time there is an interrelationship between accuracy and $T_S$ (the update rate of the tracker). This relationship specifies both an upper and lower bound on the scan time. If the scan time is permitted to get too small then accuracy will degrade because of noise on the angle statistics. If the scan time is too large then the straight line approximations used by the tracker are no longer valid and the bandwidth of the system will not be wide enough for the targets of interest and accuracy will then degrade.

At a rate given by $1/T_S$ the target state must be updated. This is accomplished in the SAM reacquisition phase which involves stopping the search program, slewing the antenna to the extrapolated target position and redetecting the target to make position measurements.

The antenna slew time for the F-16 is given by:

$$T_{slew} = (\text{Distance to Slew}) \times (\text{Slew Rate})$$

To minimize the slew time, therefore, it is important to minimize the distance that the antenna must be slewed. A substantial part of this invention is concerned with controlling the search pattern so that when the search time expires the antenna will be close to the tracked target position thus reducing or eliminating the slew time. This is very complicated since the search scan pattern may or may not include the tracked target. The algorithm which performs this task is a procedure entitled the SAM azimuth search limit algorithm, which is performed in seven steps. These steps, which include some equations which are executed to compute the search limits in SAM, are presented below:

1. $Sw = \dfrac{\dot{R}a \ (Ts - axMAX - St - W)}{MAX}$

2. $MAX = \dfrac{\dot{R}a \ (Ts - W - St)}{Sw + axRa}$

3. If RCP setting less than $Sw$ then $Sw = $ RCP setting
4. $Ns = Ca - .5x \ Sw$
5. $Ps + Ca + .5x \ Sw$
6. If tracked target is outside computed search pattern then
$$W = \dfrac{TGTaz - Baz}{\dot{R}a} + a$$
7. Recompute $Sw$ and $MAX$ Where: $\times$ is a multiplication sign and
$Sw$ = SAM Scan Width;
$\dot{R}a$ = Antenna Scan Rate (i.e., 60 deg/sec);
$Ts$ = Allowable search time in SAM;
$MAX$ = Number of times to scan pass target;
$W$ = Time to slew from Target to Search pattern if target is outside scan limits;
$a$ = Antenna turn around time (0.2 sec);
$St$ = Antenna Start/Stop time (0.25 sec);
$Ca$ = Cursor Azimuth position;
$Ns$ = Left Azimuth search boundry; and
$Ps$ = right Azimuth search boundry.

In most situations this algorithm will adjust the scan volume just enough so that when the search timer expires, the antenna will be at the tracked target position and no slew will be required. An iterative algorithm is involved which computes the limits of the scan volume, the slew time, and an angular position marker. The number of times the search antenna can scan past the marker is then computed and when this number of passes has been completed the search phase automatically expires. If the tracked target is within the search pattern then the angle marker is defined to be the target's azimuth and elevation angle. For this case the algorithm will completely eliminate any slew time and the antenna will simply be stopped when the target has been swept the proper number of times. If the target lies outside the search pattern then the angle marker will be the offbar angle closest to the target. A slew will be involved and the program computes an estimate of this time and reduces the search coverage in order that the target can be updated at the correct time.

Figure 3:
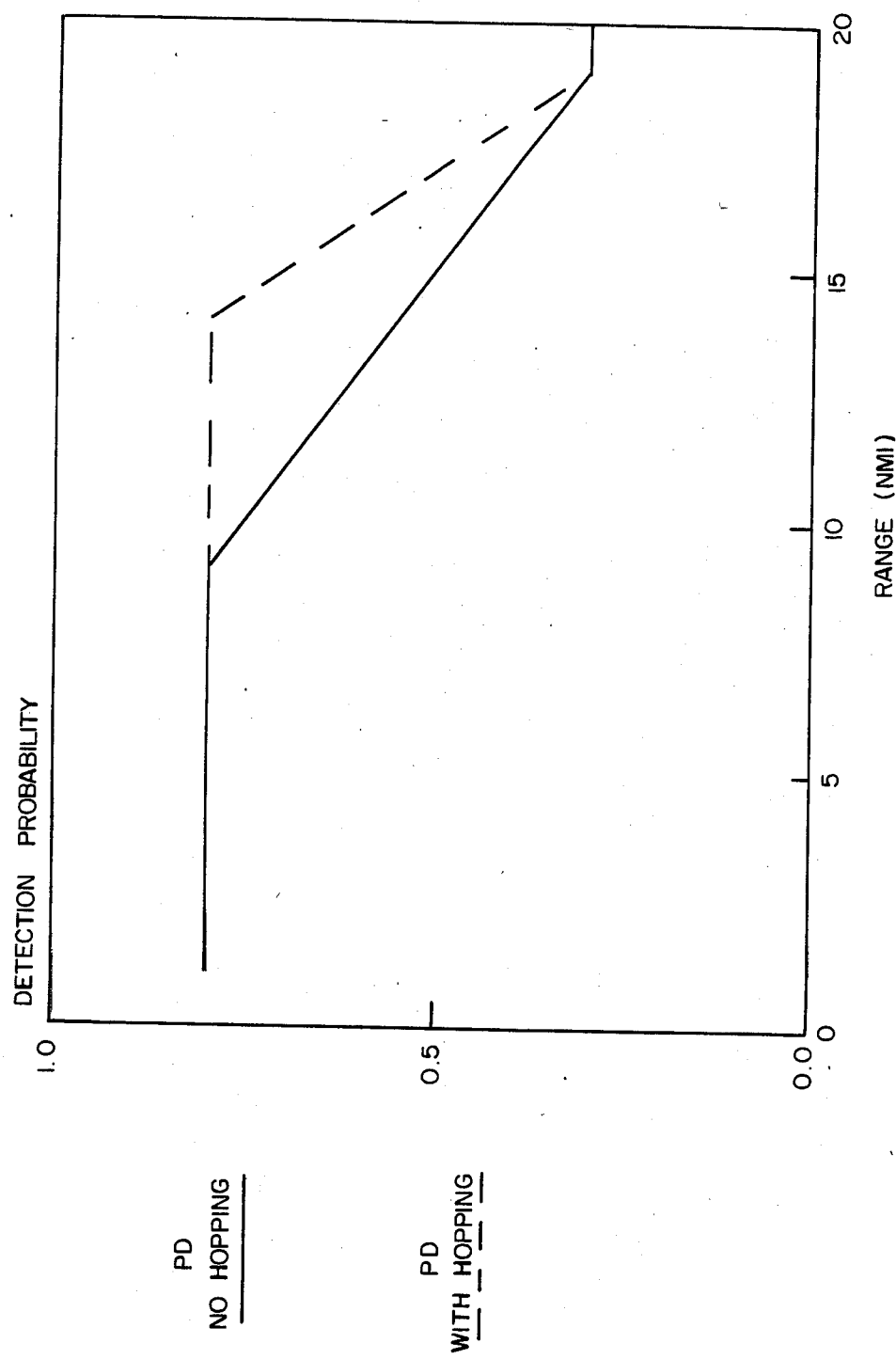
FIG. 3 is a chart estimating an improvement in detection performance with the use of the present invention.

The redetect phase of SAM involves several modifications to the APG-66 to enhance visibility. Frequency hopping has been incorporated in the radar during this phase to smooth out the effects of amplitude scintillation. Amplitude scintillation is a radar phenomenon which causes the target signal to periodically disappear. There is a high frequency component and a low frequency component to scintillation. Frequency hopping can reduce the effects of the low frequency component and smooth the radar return from the target thus enhancing visibility. This type of frequency agility cannot normally be performed during radar search since the target is not illuminated long enough to utilize multiple channels, but in SAM it is possible. A qualitative estimate of the improvement in detection performance is shown in FIG. 3.

Another novel modification to the SAM redetect phase involves reducing the degree of correlation required for a redetect. Typically to reduce the number of false alarms and to resolve range ambiguities the radar radiates multiple PRF's and requires that the target detect in at least 3 out of 8 PRF's. Reducing the degree of correlation will in general improve the detection performance but it will also generate multiple target reports at modules of the PRF. In SAM these false reports can be rejected since the target's range is known and thus the detection performance of the radar can be improved by lowering the degree of correlation without suffering any of the negative effects.

The tracked target observation phase of SAM involves combining measurements of the target's position to reduce noise effects and to estimate the targets speed and heading angle. The principle design consideration during this phase is to provide accurate information and to keep the track time to an absolute minimum. Any time spent in this mode decreases the efficiency of the search phase and this increases pilot frustration. In addition, minimizing the track time will fully exploit the inherent advantages of SAM and provide the following:

(1) Reduction in ownship radar cross section is achieved because the flat plate array is pointed at the target for a minimum amount of time.

(2) The probability of triggering the target radar homing and warning gear is reduced.

(3) Electronic counter counter measures (ECCM) are greatly improved.

(4) Finally reducing the track time while providing sufficient accuracy allows the search time to be increased.

Figure 4:
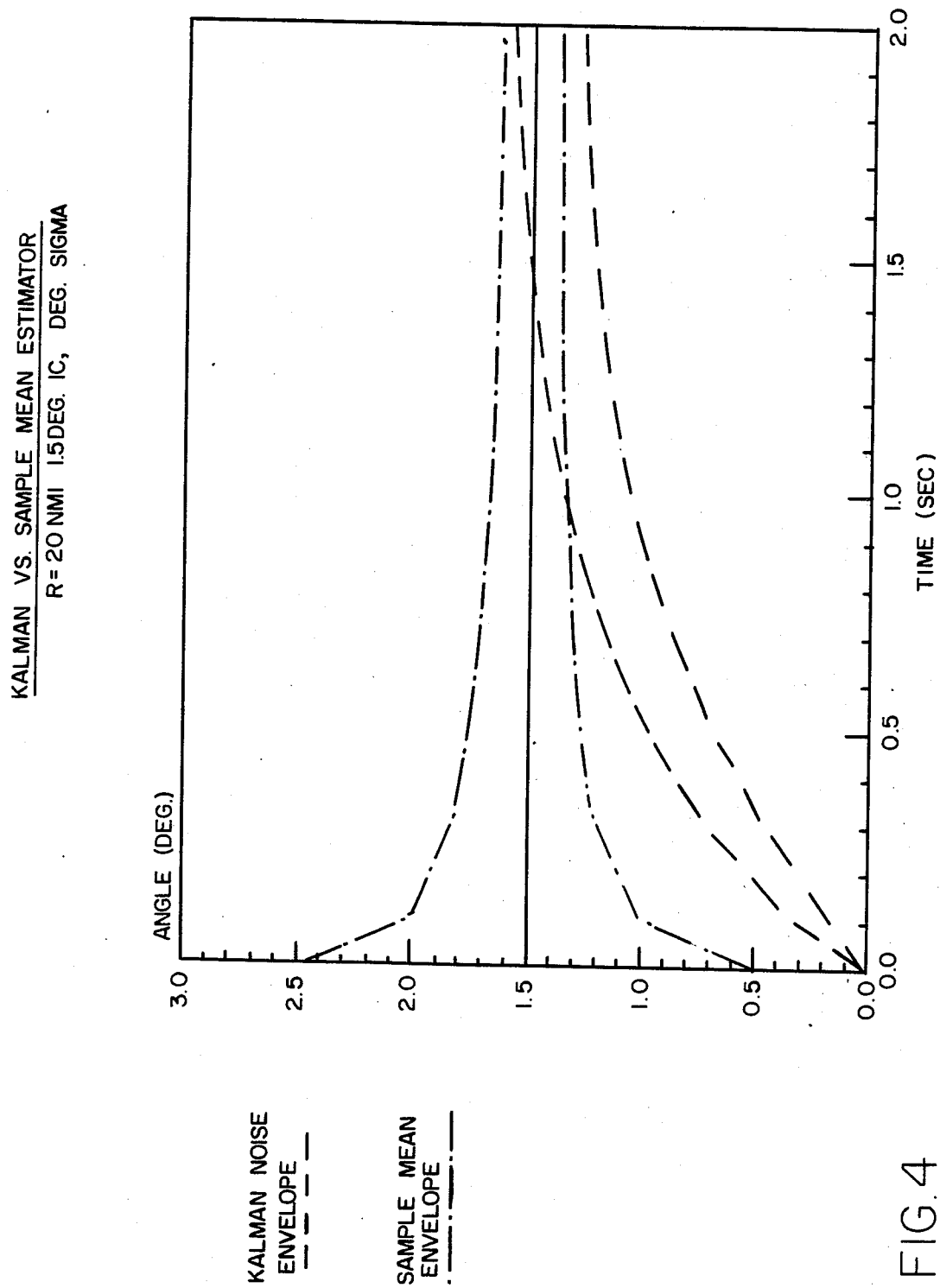
FIG. 4 is a chart comparing lockons time of the present invention vs. that of a Kalman filter.

A large part of this invention is concerned with how to achieve these goals. The initial concept for the track phase involved utilizing the single target Kalman already implemented in the APG-66 to estimate the target state. This tracker, however, requires between 2 and 4 seconds to achieve lockon—a significant amount of time. Investigations into alternative approaches have lead to the development of a minimum variance estimator. Initial estimates of performance indicate that with this tracker the lockon time can be reduced to between 0.25 and 0.5 seconds almost a factor of 10 improvement over the Kalman approach. The concept is that during the lockon the only requirement on the radar is to estimate the target's position. This is done with the sample mean—an absolute minimum variance filter which mathematically provides a position estimate with the smallest possible error in the smallest amount of time. FIG. 4 gives a comparison of the angular settling time during lockon for the SAM position estimator vs. the Kalman. The initial angle error for this graph is 1.5 degrees and the standard deviation of the angular measurement is 1 degree. For each approach a solution envelope is presented which yields a one standard deviation boundary. As seen the Kalman gives a biased estimate of position during the entire lockon and slowly settles while the SAM estimator is unbiased and settles quickly.

As mentioned in order to estimate the target's position during the lockon, the sample mean is used. This mean is a minimum variance unbiased estimator of the true target position and cannot be improved any further. It is the same estimate that a recursive least squares tracker, such as is used in the APG-66 single target track mode would provide if it were tuned properly where an estimate of measurement noise and initial angle error must be provided. This can never be done correctly since it would require apriori knowledge and average values from simulations and flight results are supplied instead. The resulting performance is suboptimal for any specific case and the settling time is extensive. The sample mean, on the other hand, requires no apriori knowledge and is optimal for every case regardless of whether or not the target is large or small, or is using an angle deception jammer.

The sample mean approach enjoys another advantage over the Kalman in that an estimate of the position noise can easily be obtained and controlled from simple equations. The Kalman formulation allows control to be implemented but the equations are not simple and in the APG-66 radar there is not enough computer power to execute them correctly. At any rate dynamic control of the tracker output is an important feature when the accuracy requirements change such as at missile launch or when jammers are being used.

The standard deviation of the SAM position measurement is called the standard error of the mean and is given by:

$$SIGS = SIGP/\sqrt{N}$$

where:

Sigp is the standard deviation of the population distribution

N is the number of samples in the mean.

Thus to improve the position measurement during SAM the lock time can be extended to increase N. SIGP can easily be estimated by computing the sample standard deviation.

Once an estimate of the target's position is obtained the tracker must derive its velocity. The Kalman approach to estimating the speed suffers from the same tuning problems described above of requiring apriori estimates of noise and initial conditions. Furthermore, as will be shown the Kalman or any least squares tracker is extremely wasteful and actually discards information thereby requiring larger than necessary lockon times.

To see this consider the equation for the slope of a least squares line passing through the data points (Y1,T1), (Y2,T2), ... (Yn,Tn) where T1,T2, ... ,Tn represent time with the average time equal to Tb and Y1,Y2, ... ,Yn are position measurements. The equation of the slope using all the data is given by:

$$VEL = 1/C(T1-Tb) \times Y1 + (T2-Tb) \times Y2 + \ldots + (Tn-Tb) \times 1/n$$

This estimate of velocity is of the form of a finite difference filter $$VEL = W1 \times Y_1 + W2 \times Y_2 + W3 \times Y_3 + \ldots + Wn \times Y_n$$

where the W's constitute a weighting vector and × is a multiplication sign. The values of the weights for data samples close to the center of the interval (Tb) are seen from the above formulation to be close to zero while the weights for the data samples near the end points are large. Intuitively this means that the data near the center of the interval is not used in estimating the slope of a straight line with an LSQ tracker. Thus, if the Kalman were used in SAM very large lock times would be necessary and most of the data would be thrown away. This fact was recognized during the early stages of SAM development and an alternative approach was invented to estimate the target's velocity which was not so wasteful. The Kalman tracker, however, has important uses during single target track and it is not being implied here that it should be replaced. The requirement for SAM is to estimate a single value of target speed as opposed to a continuous history and the present invention serves this purpose better than the APG-66 Kalman tracker.

To obtain the target velocity the present invention computes the slope of a straight line passing through the position measurements made at a rate of $1/T_s$ HZ ($T_s$ is the search time). After each new measurement is obtained the speed is computed using the following formulas:

$$V = (P_1 - P_2)/(T_s + T_1) \qquad \text{Eq. 3}$$

Where:
P$_1$ is the first radar measured position vector;
P$_2$ is the second radar measured position vector;
T$_s$ is the scan time; and
T$_1$ is the lock time.

It can be shown that this is a relatively good estimate of the slope of a least squares straight line passing through all the data as would be obtained from a LSQ tracker.

There are restrictions of course having to do with how closely the target maneuver can be approximated by the straight line. There are three cases to consider. The first case postulates a target flying a straight course with no acceleration (as might be the situation at long range). In this case Equation 3 will predict the velocity very accurately since the actual target is flying a straight line course. The variance or standard deviation of the velocity estimate is easily computed as:

$$SIG_v = sqrt(2/N) \times sig_p / (T_s + T_1) \qquad \text{EQ. 4}$$

Where:
$sig_p$ is the raw measurement accuracy;
N is the number of measurements included in the mean;
$T_s$ is the scan time; and
$T_1$ is the lock time.

This is an interesting equation for it shows that the velocity estimates (for the non accelerating target) may be improved by increasing the scan time $T_s$ or by increasing the lock time $T_1$ or by increasing the update rate of the tracker (N).

Figure 5:
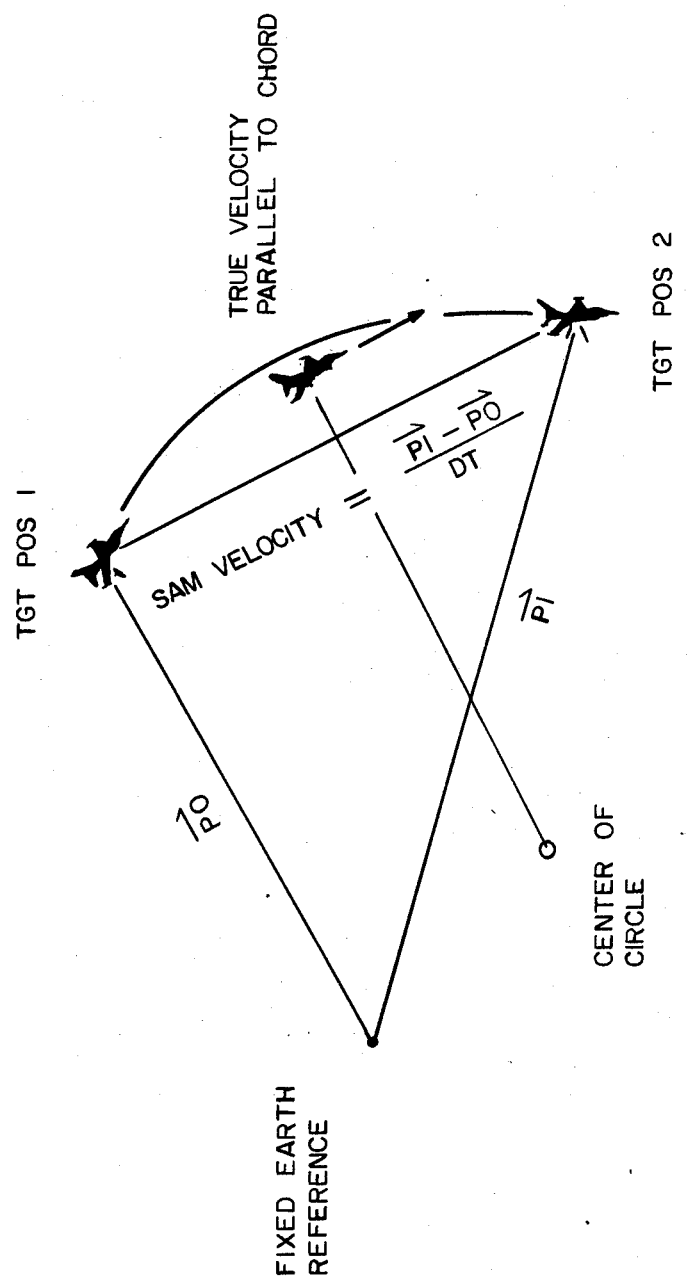
FIG. 5 is an illustration of a target which is pulling a constant G force.

A second case must be considered and that is for a target which is pulling a constant acceleration (A) with a speed (V). Such a target is traveling along an arc of radius $R = v^2/A$ and not along a straight line. This case is shown in FIG. 5. As seen the straight line approximation yields a vector whose direction is approximately correct at the center of the scan interval, being tangent to the circle at that point. Use of equation 3 as an approximation to the velocity of the target yields a vector with a time delay equal to half the scan time. It's magnitude will be wrong by the difference between arc length and cord length (typically quite small). The speed error is given by the following approximation, which is straight forward to derive:

$$\text{SPEED ERROR} = 43.2 \, (G \times T) \times 2/V \qquad \text{EQ. 5}$$

Where: G = target acceleration in G's and $\times$ is a multiplication sign.

This equation provides an upper bound on the scan time which will yield a specified accuracy. Typically the scan time provided by this equation is much larger than that provided by equation 1 and, therefore, it can usually be ignored.

Figure 6:
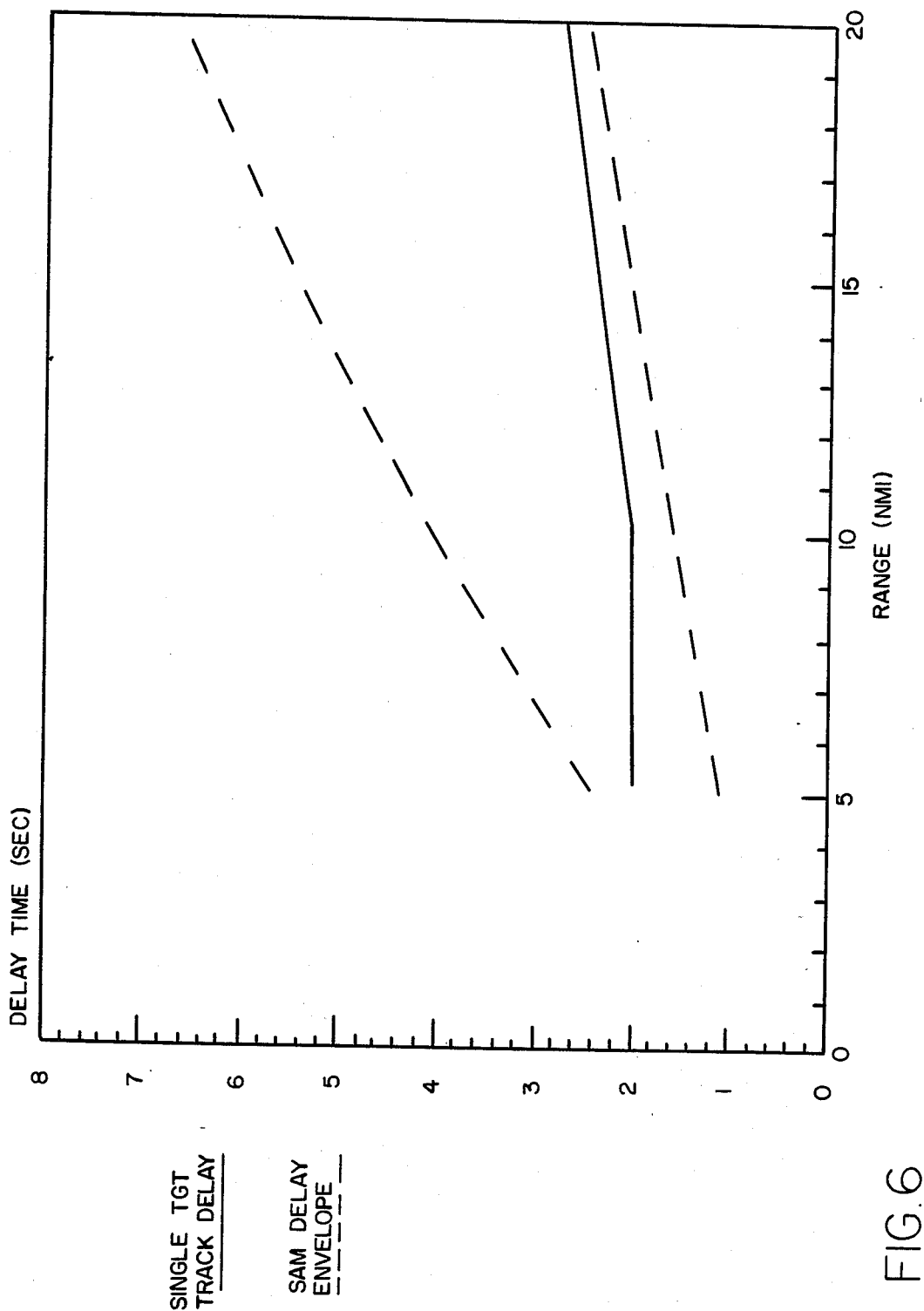
FIG. 6 is a chart comparing SAM vs. STT heading delay time.

Thus, even if the target is pulling a constant G acceleration the straight line approximation used by the SAM tracker yields an approximately correct albeit delayed version of the true velocity. Of course even the LSQ tracker has an inherent delay in estimating the velocity. FIG. 6 compares the delay of the SAM tracker to the APG-66 Kalman tracker. The Kalman delay is shown as a solid line. The SAM delay is presented as an envelope. When the SAM tracker first makes its estimate of target velocity it has a delay given by the lower curve. SAM then reenters it's search phase for a certain time dependent on range, etc. and it's delay grows to the value shown by the upper curve. From the Figure the SAM tracker initially has less delay than the Kalman and inevitably grows to a larger value.

Figure 7:
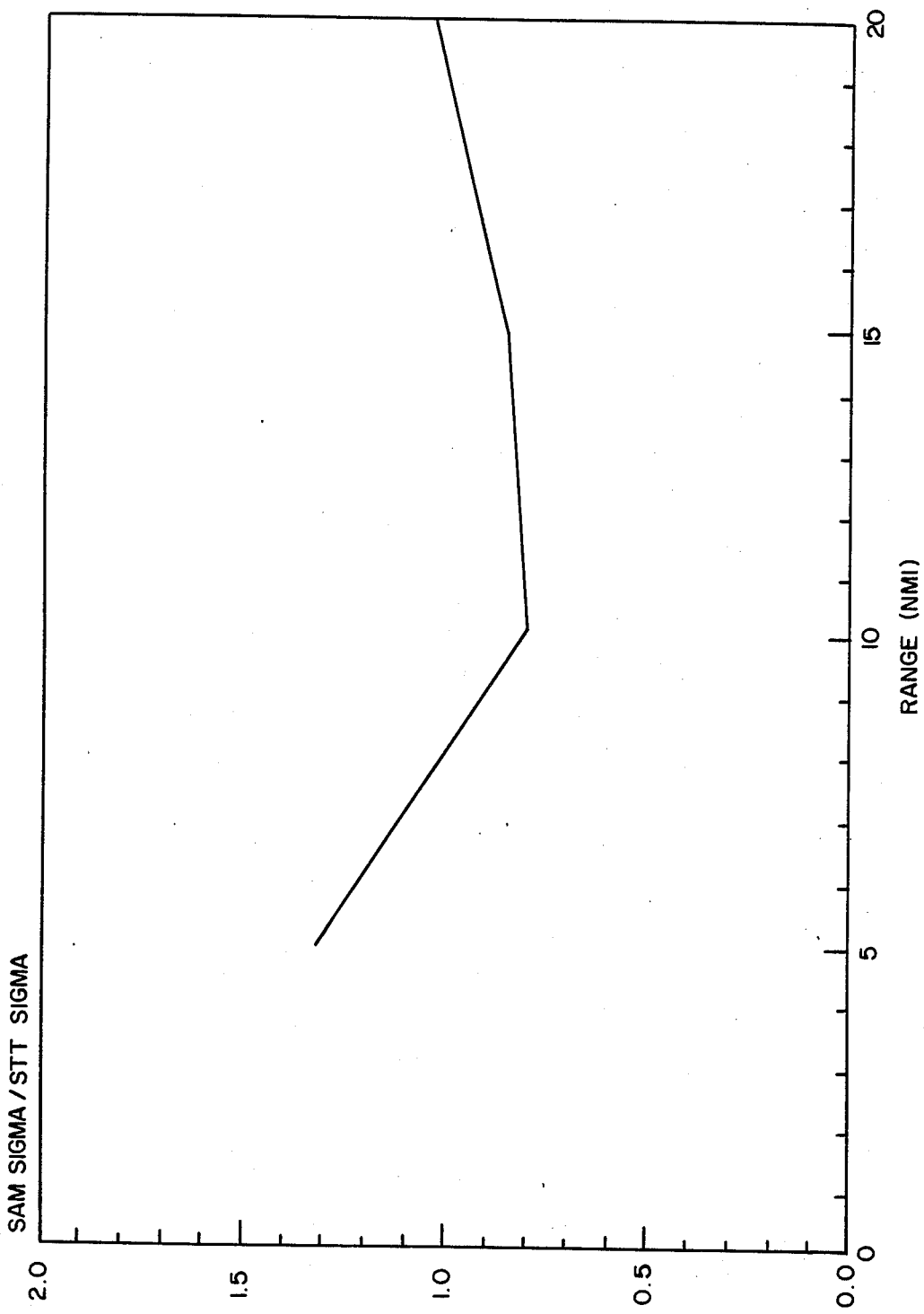
FIG. 7 is a chart comparing SAM vs. STT speed accuracy.

FIG. 7 presents the ratio of SAM velocity standard deviation to the Kalman standard deviation. A value of one on this chart states that the two trackers have the same noise. As seen the noise rejection capability of the SAM tracker is comparable to the Kalman.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In a single target tracking radar system which normally tracks a single selected target, wherein said radar system includes an antenna, a servo mechanism which mechanically steers said antenna, a transmitter which generates radar signals which are transmitted out said antenna, a radar receiver which receives target echo return signals from said antenna, a memory, and a system control computer which directs all activities of said radar system, the improvement comprising a procedure to provide a simultaneous search for additional targets while maintaining tracking on said target, said procedure comprising the steps of:

searching for additional targets in a search pattern during a search time while controlling said search pattern so that when said search time expires said antenna is close to the selected target, said searching step thereby minimizing a time it takes said servomechanism to slew said antenna so that it is pointing at said selected target; said searching step includes substeps to compute a scan volume so that when said search time expires, the antenna approaches the selected target position to minimize slew time, said substeps including a first and second calculating substep, a defining substep, a counting substep, and a terminating substep, said first calculating substep including a calculation of the search time and scan width, wherein said first calculating substep calculates said search time using a search time equation which comprises:

$$[(\tfrac{1}{2}) (A) (T_s^2) + (2) (SIG) (T_s)]/R = E$$

Where:
A = Expected target acceleration (ft/sec$^2$),
SIG = standard deviation of target speed error (ft/sec),
R = target range (ft),
E = allowable angle error (radians), and
$T_s$ = allowable scan time (sec), said defining substep including defining an angular position marker to indicate limits of said scan volume, said limits being given by said scan width and said angular position marker, said angular position marker being an angular position in azimuth and elevation at which said antenna is positioned upon the completion of each radar pass in said searching step, wherein said angular position marker comprises the azimuth and elevation of said selected target when it is contained on said search pattern and, said angular position marker being the azimuth and elevation closest to that of said selected target when the selected target lies outside the search pattern; said second calculating substep including calculating a number of times the antenna can scan pass the search volume; said counting substep including counting the number of passes said antenna makes during said searching step to obtain a scan count; and said terminating substep including terminating said searching step when said scan count obtained in said counting step reaches the number obtained in said second calculating step;

reacquiring said target by slewing said antenna towards an extrapolated target position, transmitting said radar signals towards said target and collecting target echo return signals to make measurments of said target's position in terms of range, azimuth, and elevation; and tracking said target by making estimates of said selected target's position and velocity from said range, azimuth and elevation measurements made in said reacquiring step, said tracking step including minimizing the amount of time spent tracking said selected target to increase said search time.

2. A procedure, as defined in claim 1, wherein said first calculating substep calculates said scan width using a scan width equation which comprises:

$$\dot{R}_a (TS-(a)(MAX)-St-W)]$$
MAX

Where:
SW = Scan Width,
$\dot{R}a$ = Antenna Scan Rate,
TS = Allowable search time,
MAX = Number of times to scan pass the search volume limits;
W = Time to slew from Target to Search pattern if target outside scan limits,
a = Antenna turn around time, and
St = Antenna Start/Stop time.

3. A procedure, as defined in claim 2, wherein said first calculating substep calculates a maximum number of times to scan pass the search volume using a maximum scan number equation which comprises:

$$MAN = [\dot{R}_a (Ts-W-St)][SW+(a)R_a)]$$

Where:
SW = Scan Width,
$\dot{R}a$ = Antenna Scan Rate,
TS = Allowable search time,
MAX = Number of times to scan pass the search volume limits;
W = Time to slew from Target to Search pattern if target outside scan limits,
a = Antenna turn around time, and
St = Antenna Start/Stop time.

4. A procedure, as defined in claim 3, wherein said first calculating substep includes setting said scan width to a smaller value than the scan width calculated using said scan width equation when a requested search pattern entails a width of said smaller value.

5. A procedure, as defined in claim 4, wherein the amount of time to slew said antenna to said selected target in said reacquiring step comprises:

zero when said selected target is within said search pattern; and
said amount of time which is calculated by $$W = \frac{(TGTaz - Baz)}{\dot{R}_a} + a$$

when said selected target is outside a requested search pattern, where:
W equals the time to slew the antenna to the selected target,
TGTaz equals the target azimuth,
Baz equals the azimuth of said angular position marker,
a equals the antenna turn around time, and
a equals the antenna scan rate.

6. A procedure, as defined in claim 5, wherein said reacquiring step starts at the expiration of said search time and includes the following substeps:

stopping the searching step;
slewing the antenna to an extrapolated target position;
redetecting the selected target by making measurements of target range, azimuth and elevation; and
frequency hopping to enhance visibility of target echo return signals and to smooth out effects of amplitude scintillation in said target echo return signals.

7. A procedure, as defined in claim 6, wherein said tracking step includes estimating the selected target's position and velocity from range and angular measurements made during the reacquiring step, said velocity being derived from the following substeps:

making N position measurements at a rate of $1/T_s$ Hz; and
after each new measurement is made in said reacquiring step, computing said velocity of said target by:

$$V = (P_1 - P_2)/(T_s + T_1)$$

where:
$P_1$ equals a first position measurement of said selected target,
$P_2$ equals a second position measurement of said selected target,
$T_s$ equals the scan time; and
$T_1$ equals the lock time.

* * * * *